Nov. 7, 1933.    G. R. DAHLMAN    1,934,411
AIR CYLINDER FOR CHUCKS
Filed Aug. 7, 1931
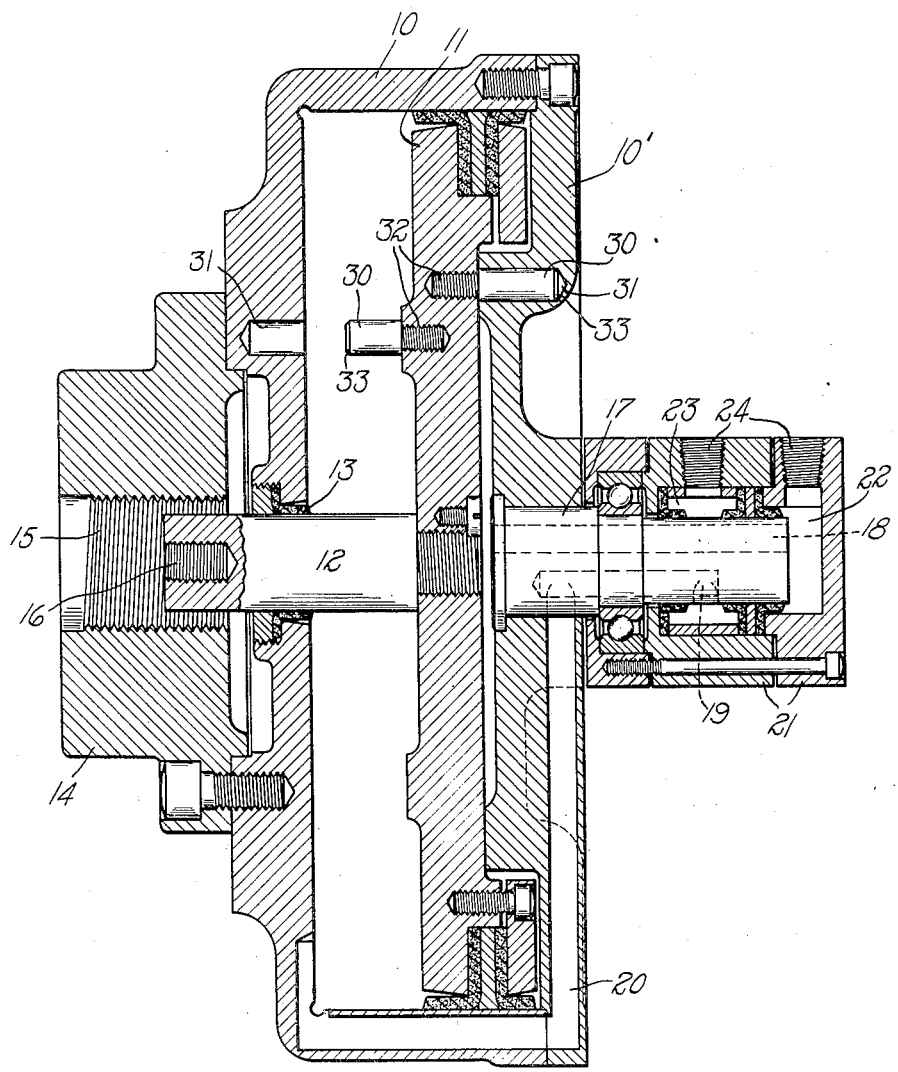
Inventor
Gustave R. Dahlman
By K. Clay Lindsey.
Attorney Patented Nov. 7, 1933

1,934,411

UNITED STATES PATENT OFFICE 1,934,411

AIR CYLINDER FOR CHUCKS

Gustave R. Dahlman, New Britain, Conn., assignor to The Skinner Chuck Company, New Britain, Conn., a corporation of Connecticut Application August 7, 1931. Serial No. 555,808

3 Claims. (Cl. 121—38)

This invention relates generally to chuck operating means of the sort having a rotating cylinder fixed to a spindle which carries the chuck, and a piston axially movable within the cylinder and associated by a draw bar or the like with the chuck, the arrangement being such that, when air or other fluid under pressure is admitted to the cylinder to one side of the piston, the chuck jaws will be opened, and when air is admitted to the other side of the piston, the jaws will be closed.

Machines equipped with air cylinders of this type are often required to have high spindle speeds and, in such instances, particularly where the air or chuck operating mechanism is relatively large, there is a tendency for the piston, due to its inertia, to creep angularly or rotate with respect to the cylinder, especially when the spindle is suddenly started or stopped, as is so frequently the case. This is objectionable because it may result in derangement of the parts and, particularly, in the loosening or detachment of the draw bar which connects the piston to the chuck member which moves the jaws in and out.

The aim of the present invention is to provide chuck operating mechanism of this class with an improved arrangement of very simple character for effectively preventing relative angular movement between the piston and the cylinder under all operating conditions. The means for accomplishing this result may be incorporated in the air cylinder at very little additional cost.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one of the many embodiments which the present invention may take:

The figure is a cross sectional view through an air cylinder in which my improvements are incorporated.

Referring to the drawing in detail, 10 designates the shell or cylinder proper having a cover 10' suitably secured in place. Within the cylindrical chamber of the shell is a round piston 11 to which is connected a stud 12 extending through a stuffing box 13 in the end wall of the cylinder. Secured to the cylinder 10 is an adapter 14 which may be connected on the spindle (not shown) of the machine in any suitable manner; for example, it may be threaded, as at 15, so as to be screwed onto the rear end of the spindle. The forward end of the stud 12 may be threaded, as at 16, so that the rear end of the draw bar (not shown) may be screwed thereinto. Secured to the center of the cover 10', so as to rotate therewith, is an air shaft 17 having a passage 18 therethrough leading to the rear side of the piston. This shaft also has an air passage 19 leading to a piston air port or passage 20 in the cylinder wall. This air passage 20 leads to the cylinder in front of the piston. The numeral 21 designates the parts of an air inlet housing having chambers 22 and 23 respectively communicating with the passages 18 and 19. These respective chambers have threaded ports 24 adapted to receive pipes leading from a valve which controls the admission of air or other fluid to the cylinder. The arrangement so far described is an old and well-known one and is shown by way of illustration only. It, therefore, need not be further described in detail. It is sufficient to say that, when air or other fluid under pressure is admitted to the chamber 22, that air will flow through the passage 18 to behind the piston, thereby forcing the piston forwardly and opening the jaws or closing them, as the case may be, the exact operation depending upon the construction of the chuck which, of itself, may be of any suitable kind or type. When it is desired to grip the work, air under pressure is admitted to the chamber 23, and this air will flow through the passages 19 and 20 to the space forwardly of the piston, thereby moving the piston rearwardly.

In accordance with the present invention, and in order to prevent relative rotary movement between the piston and the cylinder, the piston is provided with projections 30 extending from its opposite faces, and the cylinder wall is provided with recesses 31 adapted to respectively receive these projections, the arrangement being such that either one of these projections is engaged within its respective recess at all times so that there can be no relative angular movement between the piston and the cylinder. In the present instance, these projections are in the form of pins having threaded studs 32 screwed into tapped openings in the piston. These pins are preferably round, and they are parallel to the axis of rotation of the air cylinder. The recesses 31 are in the form of round bores of such diameter as to more or less closely, yet freely, receive the pins 30. By preference, the ends of these pins are slightly bevelled or chamfered, as at 33, so as to insure proper engagement of the pins in the recesses when the piston is reciprocated. It will be observed that the distance between the outer ends of the two pins is slightly greater than that between the open ends of the recesses 31 so that, before the right hand pin leaves its recess, the left hand pin is engaged in its recess, thus insuring proper interlocking relation between the piston and cylinder at all times. It will further be observed that my improved arrangement is a very simple one and adds but little to the cost of the air cylinder.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language might be said to fall therebetween.

I claim as my invention:

1. A chuck operating means of the character described, including a rotatable cylinder, a piston mounted therein for axial movement and adapted to be connected to a chuck, and round pins carried by one of said members and located to opposite sides of the piston, said pins being parallel to the axis of rotation of the cylinder, the other of said members having round bores aligned with and adapted to respectively receive said pins, said pins being so related to said recesses that one or the other of said pins is engaged in its respective recess at all times.

2. A chuck operating means of the character described, including a rotatable cylinder, a piston mounted therein for axial movement and adapted to be connected to a chuck, and a pair of pins respectively extending from opposite faces of said piston and arranged parallel to the axis of rotation of the cylinder, said cylinder having in its front and rear walls recesses respectively aligned with said pins and adapted to respectively receive the same, the distance between the outer ends of said pins being greater than the distance between the open ends of said recesses.

3. A chuck operating means of the character described, including a rotatable cylinder, a piston mounted therein for axial movement and adapted to be connected to a chuck, and round pins carried by one of said members and located to opposite sides of the piston, said pins being parallel to the axis of rotation of the cylinder, the other of said members having round bores alined with and adapted to respectively receive said pins, said pins being so related to said recesses that one or the other of said pins, depending upon the position of said piston, is engaged in its respective recess while the other pin is free of its recess.

GUSTAVE R. DAHLMAN.